United States Patent
Ishizawa et al.

(10) Patent No.: US 11,642,652 B2
(45) Date of Patent: May 9, 2023

(54) INORGANIC FIBER SHEET, HONEYCOMB MOLDED BODY AND HONEYCOMB FILTER

(71) Applicant: Oji Holdings Corporation, Tokyo (JP)

(72) Inventors: Hitoshi Ishizawa, Tokyo (JP); Masahiro Kawakita, Tokyo (JP); Yuki Kita, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 1059 days.

(21) Appl. No.: 16/342,012

(22) PCT Filed: Oct. 24, 2017

(86) PCT No.: PCT/JP2017/038298
§ 371 (c)(1),
(2) Date: Apr. 15, 2019

(87) PCT Pub. No.: WO2018/079529
PCT Pub. Date: May 3, 2018

(65) Prior Publication Data
US 2019/0247828 A1   Aug. 15, 2019

(30) Foreign Application Priority Data
Oct. 24, 2016  (JP) .............................. JP2016-207709

(51) Int. Cl.
| | | |
|---|---|---|
| *B01J 20/00* | (2006.01) | |
| *B01J 20/28* | (2006.01) | |
| *B01J 20/16* | (2006.01) | |
| *B01J 20/12* | (2006.01) | |
| *D04H 1/64* | (2012.01) | |
| *B01J 20/20* | (2006.01) | |
| *B01J 20/26* | (2006.01) | |
| *B01J 35/04* | (2006.01) | |
| *D04H 1/4218* | (2012.01) | |
| *B01J 20/18* | (2006.01) | |
| *D21H 13/24* | (2006.01) | |
| *C04B 41/85* | (2006.01) | |
| *C04B 38/00* | (2006.01) | |
| *D21H 13/40* | (2006.01) | |
| *B01J 20/10* | (2006.01) | |

(52) U.S. Cl.
CPC ......... *B01J 20/28045* (2013.01); *B01J 20/10* (2013.01); *B01J 20/12* (2013.01); *B01J 20/165* (2013.01); *B01J 20/18* (2013.01); *B01J 20/20* (2013.01); *B01J 20/26* (2013.01); *B01J 20/28* (2013.01); *B01J 20/28023* (2013.01); *B01J 35/04* (2013.01); *C04B 38/00* (2013.01); *C04B 41/85* (2013.01); *D04H 1/4218* (2013.01); *D04H 1/64* (2013.01); *D21H 13/24* (2013.01); *D21H 13/40* (2013.01)

(58) Field of Classification Search
CPC . B01J 20/10; B01J 20/12; B01J 20/165; B01J 20/18; B01J 20/20; B01J 20/26; B01J 20/28; B01J 20/28011; B01J 20/28023; B01J 20/28045; B01J 35/04
See application file for complete search history.

(56) References Cited

U.S. PATENT DOCUMENTS

| | | | |
|---|---|---|---|
| 2001/0029843 A1 | 10/2001 | Minoru et al. | |
| 2005/0022671 A1 | 2/2005 | Yamazaki et al. | |
| 2012/0039756 A1* | 2/2012 | Beauharnois | ........... C04B 14/42 428/221 |
| 2012/0039759 A1* | 2/2012 | Narula | ..................... B01J 29/46 502/77 |

FOREIGN PATENT DOCUMENTS

| | | |
|---|---|---|
| CN | 102505554 | 6/2012 |
| CN | 105951504 | 9/2016 |
| JP | 60-33250 | 2/1985 |
| JP | 62-110718 | 5/1987 |
| JP | 63-317535 | 12/1988 |
| JP | 3-174086 | 7/1991 |
| JP | 4-263695 | 9/1992 |
| JP | 6-165934 | 6/1994 |
| JP | 8-71352 | 3/1996 |
| JP | 10-46486 | 2/1998 |
| JP | 10-80612 | 3/1998 |
| JP | 10-252000 | 9/1998 |
| JP | 2925127 | 7/1999 |
| JP | 2001-205029 | 7/2001 |
| JP | 2001-310109 | 11/2001 |
| JP | 2005-304844 | 11/2005 |
| JP | 2006-007209 | 1/2006 |
| JP | 2006-212509 | 8/2006 |
| JP | 3848132 | 11/2006 |
| JP | 2009-183905 | 8/2009 |

(Continued)

OTHER PUBLICATIONS

International Search Report dated Dec. 26, 2017 in corresponding International (PCT) Application No. PCT/JP2017/038298.
Teruo Tamai, "Fiber thickness measurement method (laser scan method) No. 98056", Technical Sheet of Osaka Research Institute of Industrial Science and Technology, Evaluation Technology Department Industrial Textile Group, Feb. 17, 1999.
Atsushi Honda et al., "Method for Determining the Fiber Length of Pulp and Paper—Automated Optical Measuring Technique-", Japan Paper Industry Co., Ltd., Japan TAPPI Journal, vol. 43, No. 5, pp. 39-45, May 1989, with English abstract.

(Continued)

*Primary Examiner* — Sharon Pregler
(74) *Attorney, Agent, or Firm* — Wenderoth, Lind & Ponack, L.L.P.

(57) ABSTRACT

This inorganic fiber sheet contains a glass fiber as a main component, while containing 3 to 20% by mass of an organic fiber having an aspect ratio of 300 to 2000 with respect to a total amount of the inorganic fiber sheet.

5 Claims, No Drawings

(56) References Cited

FOREIGN PATENT DOCUMENTS

| | | |
|---|---|---|
| JP | 2009-234878 | 10/2009 |
| JP | 2010-13773 | 1/2010 |
| JP | 2010-253391 | 11/2010 |
| JP | 2011-183326 | 9/2011 |
| JP | 2012-77400 | 4/2012 |
| JP | 2012-107350 | 6/2012 |
| JP | 2012-166158 | 9/2012 |
| JP | 2013-234410 | 11/2013 |
| JP | 2014-18722 | 2/2014 |
| JP | 2014-84548 | 5/2014 |
| JP | 5558518 | 7/2014 |
| JP | 2016-79553 | 5/2016 |
| JP | 2016-132842 | 7/2016 |
| TW | 376327 | 12/1999 |
| TW | 200937467 | 9/2009 |
| TW | 1410268 | 10/2013 |
| WO | 91/16119 | 10/1991 |
| WO | 2009/141899 | 11/2009 |
| WO | 2018/079529 | 5/2018 |

OTHER PUBLICATIONS

Yoshitoshi Shiratori, "Development of synthetic fibers and the latest prospects", The Annual Research Report of Soai University & Soai Women's Junior College, vol. 15, pp. 1-33, 1968.
JIS P 8251 (2003).
JIS P 8115 (2001).
Transmittal Notice of Duplicate of Opposition issued Nov. 29, 2021 in corresponding Japanese Patent No. 6866895, Opposition No. 2021-700995 (59 pages), with partial English-language translation.
Transmittal Notice of Duplicate of Opposition issued Nov. 29, 2021 in corresponding Japanese Patent No. 6866895, Opposition No. 2021-700995 (25 pages), with partial English-language translation.
Office Action dated Dec. 31, 2020 in Chinese Patent Application No. 201780064704.7, with English Translation.
Office Action dated Feb. 16, 2022 in Chinese Patent Application No. 201780064704.7, with English-language translation.
(Corrected) Transmittal Notice of Duplicate of Opposition issued Nov. 29, 2021 in corresponding Japanese Patent No. 6866895, Opposition No. 2021-700995 (25 pages), with partial English-language translation.
Notice of Reasons for Rejection dated Mar. 8, 2022 in Japanese Patent Application No. 2021-065949, with English translation.
Supplementary European Search Report dated May 6, 2020 in corresponding European Patent Application No. 17865963.7.
Office Action dated Feb. 5, 2021 in Taiwanese Patent Application No. 106136469, with English translation.
Third Party Observation mailed Sep. 6, 2022 in corresponding Japanese Patent Application No. 2021-065949, with English translation.
DuPont Toray Co., Ltd. Kevlar (Registered Trademark) Product Catalog issued in Jun. 2000, pp. 1-6.
Written Opinion dated Sep. 30, 2022 in corresponding Japanese Patent Application No. 2018-547679, pp. 1-7, with English translation.
Decision on Opposition mailed Sep. 30, 2022 in corresponding Japanese Patent Application No. 2018-547679, pp. 1-20, with English machine translation.

\* cited by examiner

INORGANIC FIBER SHEET, HONEYCOMB MOLDED BODY AND HONEYCOMB FILTER

TECHNICAL FIELD

The present invention relates to an inorganic fiber sheet, a honeycomb molded body, and a honeycomb filter.

Priority is claimed on Japanese Patent Application No. 2016-207709, filed Oct. 24, 2016, the content of which is incorporated herein by reference.

BACKGROUND ART

Since ceramic fibers have characteristics such as high heat resistance, high thermal insulation properties, and incombustibility, inorganic fiber sheets using ceramic fibers are widely used. For example, the inorganic fiber sheet is used as a carrier or the like of functional materials such as a heat insulating material, a heat resistant cushioning material, a heat resistant shielding material, a separator and a catalyst. Further, a honeycomb molded body obtained by subjecting an inorganic fiber sheet to a corrugating process is used as a honeycomb filter for heat exchange which carries a functional material such as an adsorbent, or a honeycomb filter for gas adsorption.

For example, Patent Documents 1 and 2 describe a method for producing an inorganic fiber sheet in which a raw material slurry containing a ceramic fiber, an organic binder, a mountain leather and the like is prepared, and making the raw material slurry into an inorganic fiber sheet by a papermaking process. Here, the mountain leather is one type of naturally occurring clay minerals, and is hydrated magnesium silicate. The mountain leather is used as an inorganic binder. In addition, Patent Document 2 describes that a honeycomb molded body is formed by subjecting an inorganic fiber sheet to a corrugating process, followed by firing, thereby making the resultant fired body to carry an adsorbent or the like and forming a gas adsorbing element (honeycomb filter).

However, ceramic fibers are classified in Category 2 (suspected of being carcinogenic) under EU Directive 97/69EC for man-made vitreous fibers by the EU (European Union). For this reason, from the viewpoint of safety to the human body, it is intended to eliminate ceramics, and, for example, substitution with glass fibers or biosoluble fibers is under consideration. It is said that the fiber diameter of the glass fiber used for the elimination of ceramics is preferably 3 μm or more.

In view of such circumstances, for example, Patent Document 3 discloses a method for obtaining an inorganic fiber sheet in which a slurry mainly composed of a biosoluble ceramic fiber and containing a glass fiber, an organic fiber, a cationic inorganic binder and sepiolite, which is a kind of mountain leather, is subjected to a papermaking process.

However, it is difficult for the biosoluble ceramic fiber to obtain strength, and there is a problem that the weight reduction or thinning is difficult.

CITATION LIST

Patent Documents

[Patent Document 1] Japanese Unexamined Patent Application, First Publication No. Sho 60-33250
[Patent Document 2] Japanese Patent No. 2925127
[Patent Document 3] Japanese Patent No. 5558518

SUMMARY OF INVENTION

Technical Problem

On the other hand, since the fiber diameter and the fiber length of the glass fiber substituting the ceramic fiber are large, an inorganic fiber sheet produced using this as a raw material is hard and is difficult to follow the shape. For this reason, there is a problem of corrugating processability in that it is difficult to form a corrugated shape, and the fiber is easily broken at the top of the wave to form a non-uniform cell shape. The problem of corrugating processability is prominent especially in the case of small cell shape.

Reducing the amount of binder, increasing the amount of organic fiber, thinning and the like are known as methods for making the inorganic fiber sheet flexible or to easily follow the shape. However, if the amount of the binder in the inorganic fiber sheet is reduced too much, there is a possibility that the corrugation peak will be split at the time of imparting a corrugated shape between the gears during the corrugating process, or a possibility of generation of paper dust due to a decrease in the bonding between fibers or surface strength.

In addition, when the amount of the organic fiber in the inorganic fiber sheet is increased, in a honeycomb molded body subjected to a firing treatment, there is a possibility that a large fraction of organic component is reduced to ashes by firing and the strength is lowered. Further, since a porosity in the sheet become small when it is made flexible by thinning, there is a problem that the loading amount of the functional material such as an adsorbent is greatly decreased.

In the case of replacing a conventional ceramic fiber with a glass fiber as described above, it is difficult to produce an inorganic fiber sheet which is excellent in corrugating processability, does not generate paper dust during the corrugating process, and is also excellent in the loading amount of the functional material.

The present invention has been made in view of the above circumstances, with an object of providing an inorganic fiber sheet excellent in corrugating processability and having sufficient strength and capability of loading sufficient amount of a functional material, a honeycomb molded body using the inorganic fiber sheet, and a honeycomb filter including these.

Solution to Problem

The present invention has the following configurations.

[1] An inorganic fiber sheet containing a glass fiber as a main component,
wherein the inorganic fiber sheet contains 3 to 20% by mass of an organic fiber having an aspect ratio of 300 to 2000 with respect to a total amount of the inorganic fiber sheet.

[2] The inorganic fiber sheet according to [1], wherein an average fiber diameter of the aforementioned organic fiber is equal to or less than 3 times an average diameter of the aforementioned glass fiber.

[3] The inorganic fiber sheet according to [1] or [2], wherein an ash content after firing in air at 500° C. for 2 hours is 60% by mass or more.

[4] The inorganic fiber sheet according to any one of [1] to [3], wherein a fold number in a papermaking direction at a load of 1.0 kg is 5 times or more.

[5] A honeycomb molded body obtained by processing the inorganic fiber sheet according to any one of [1] to [4] into a honeycomb shape.

[6] A honeycomb filter in which one or more functional materials selected from the group consisting of a silica gel, zeolite, sepiolite, activated carbon, and an ion exchange resin are supported on the honeycomb molded body according to [5].

Advantageous Effects of Invention

According to the present invention, it is possible to provide an inorganic fiber sheet excellent in corrugating processability and having sufficient strength and capability of loading sufficient amount of a functional material, a honeycomb molded body using the inorganic fiber sheet, and a honeycomb filter including these.

DESCRIPTION OF EMBODIMENTS

Hereinafter, an inorganic fiber sheet, a honeycomb molded body using the inorganic fiber sheet, and a honeycomb filter including these, which are embodiments employing the present invention, will be described in detail.

<Inorganic Fiber Sheet>

First, an example of a configuration of an inorganic fiber sheet which is one embodiment employing the present invention will be described. The inorganic fiber sheet of the present embodiment contains a glass fiber as a main component and a specific organic fiber as a main fiber.

(Glass Fiber)

The content of the glass fiber in the inorganic fiber sheet is more than 50% by mass with respect to the total mass of the inorganic fiber sheet. The content of the glass fiber in the inorganic fiber sheet is preferably 70% by mass or more, and more preferably 75% by mass, with respect to the mass of the inorganic fiber sheet as a whole. If the content of the inorganic fiber exceeds the lower limit value of the above range, the organic component reduced to ashes by firing does not become too large when the inorganic sheet is fired, and it is easy to maintain the required strength after firing. The upper limit of the content of the glass fiber is not particularly limited, but it is preferably 95% by mass or less, and more preferably 90% by mass or less. If it is not more than the upper limit value of the above range, the required mechanical strength and handling properties can be secured.

There are no particular limitations on the type of the glass fiber, and in addition to E-glass produced in large quantities, S-glass with high strength, C-glass excellent in acid resistance, and the like can be used. From the viewpoint of cost, it is preferable to use inexpensive E-glass. Further, one type of glass fiber may be used alone, or two or more types may be used in combination.

The fiber length of the glass fiber is not particularly limited, but the length weighted average fiber length of the glass fiber is preferably from 1 to 15 mm, and more preferably from 1 to 10 mm. When the length weighted average fiber length is equal to or more than the lower limit value of the above range, the strength of the obtained inorganic fiber sheet tends to be more excellent. When the length weighted average fiber length is equal to or less than the upper limit value of the above range, the obtained inorganic fiber sheet tends to have excellent texture. It should be noted that the length weighted average fiber length is calculated by measuring the fiber length of 100 fibers by microscopic observation.

The fiber diameter of the glass fiber is preferably such that the weighted average fiber diameter of the glass fiber is 3 μm or more, and more preferably 4 μm or more. If it is equal to or more than the lower limit value of the above range, it does not correspond to "WHO definition respirable fiber" and is safe to the human body. This "WHO definition respirable fiber" refers to a fibrous material that is inhaled into the body by respiration and reaches the lung as defined by the World Health Organization (WHO), and has a length of more than 5 μm, a diameter of less than 3 μm, and an aspect ratio of more than 3.

Further, the upper limit of the fiber diameter of the glass fiber is preferably such that the weighted average fiber diameter of the glass fiber is 10 μm or less, and more preferably 7 μm or less. When it is equal to or less than the upper limit value of the above range, both the strength of the inorganic fiber sheet and the strength of the honeycomb molded body obtained by processing the inorganic fiber sheet are excellent. Further, a functional material such as an adsorbent can be sufficiently supported. It should be noted that the weighted average fiber diameter is calculated by measuring the fiber diameter of 100 fibers by microscopic observation.

(Organic Fiber)

As the organic fiber applicable to the inorganic fiber sheet of the present embodiment, natural fibers and synthetic fibers can be mentioned. As the organic fiber, any one or more of natural fibers and synthetic fibers can be used.

Examples of the natural fibers include cellulose fibers such as wood pulp (softwood pulp, hardwood pulp); and natural fibers such as cotton, wool, silk, hemp and the like, and any one or more of them can be used. The wood pulp may be a beaten pulp or an unbeaten pulp. Of these, relatively inexpensive wood pulp is preferred.

The synthetic fiber is not particularly limited as long as it is a fiber which is not melted by heating during the production process of the inorganic fiber sheet, and can be appropriately selected depending on the temperature or the like of the drying temperature set in the production process of the inorganic fiber sheet. As the synthetic fiber, for example, chemical fibers such as polyethylene-based fibers, polypropylene fibers, polybutene fibers, nylon fibers, rayon fibers, cupra fibers, acetate fibers, polyvinyl chloride fibers, acrylic fibers, polyester fibers, polyurethane fibers, polyparaphenylene benzobisoxazole fibers, polyamideimide fibers, polyimide fibers, polyarylate fibers, polyetherimide fibers, vinylon fibers, polycarbonate fibers, ethylene-vinyl acetate fibers, ethylene vinyl alcohol fibers, polyphenylene sulfide fibers, polyethylene terephthalate fibers, polybutylene terephthalate fibers, polyethylene naphthalate fibers, aramid fibers, and the like can be mentioned. Further, any one of these synthetic fibers may be used alone, or two or more of them may be used in combination.

The fiber length of the organic fiber is not particularly limited as long as the aspect ratio described later is within the above range, but the length weighted average fiber length of the organic fiber is preferably from 1 to 15 mm, and more preferably from 1 to 10 mm. When the length weighted average fiber length is equal to or more than the lower limit value of the above range, the yield tends to improve at the time of papermaking. When the length weighted average fiber length is equal to or less than the upper limit value of the above range, there is a tendency that it is less likely for the organic fibers to become entangled and form a lump or the like. It should be noted that the length weighted average fiber length is calculated by measuring the fiber length of 100 fibers by microscopic observation.

The weighted average fiber diameter of the organic fiber is not particularly limited, but it is preferably 3 times or less, and more preferably 2 times or less, with respect to the weighted average fiber diameter of the glass fiber. When the weighted average fiber diameter of the organic fiber is equal to or less than 3 times the weighted average fiber diameter of the glass fiber, the effect of reducing the stiffness of the inorganic fiber sheet and the effect of improving the folding strength by the organic fiber tend to be improved. In particular, since the weighted average fiber diameter of the glass fiber is preferably from 3 to 10 µm, the weighted average fiber diameter of the organic fiber is preferably 30 µm or less, and more preferably 20 µm or less. The lower limit of the weighted average fiber diameter of the organic fiber is not particularly limited, but it is preferably 1 µm or more, and more preferably 3 µm or more. The weighted average fiber diameter of the organic fiber is preferably equal to or more than the above-mentioned lower limit value because it is relatively easy to obtain. It should be noted that the weighted average fiber diameter of the fiber diameter is calculated by measuring the fiber diameter of 100 fibers by microscopic observation. Further, when the organic fiber is flat, the cross sectional area is calculated by measuring the short diameter and the long diameter, and the diameter of a circle corresponding to the cross sectional area is taken as the fiber diameter.

In the inorganic fiber sheet of the present embodiment, the aspect ratio of the organic fiber (the ratio obtained by dividing the above-mentioned length weighted average fiber length of the organic fiber by the weighted average fiber diameter) is 300 or more. The aspect ratio of the organic fiber is more preferably 400 or more, and still more preferably 500 or more. When the aspect ratio of the organic fiber is equal to or more than the lower limit value of the above range, since the effect of reducing the stiffness is obtained and the folding strength is also increased, there is a tendency that corrugation peaks are less likely to be split and the paper dust is less likely to be generated. Further, the upper limit of the aspect ratio of the organic fiber is not particularly limited, but it is preferably 5,000 or less, and more preferably 2,000 or less. If it is equal to or less than the upper limit value of the above range, there is a tendency that the fibers are less likely to be bound together.

The content of the organic fiber in the inorganic fiber sheet is from 3 to 20% by mass, and more preferably from 5 to 15% by mass, with respect to the total mass of the inorganic fiber sheet. When the content of the organic fiber is equal to or more than the lower limit value of the above range, an undulating pattern at the time of the corrugating process is favorable, the wave shape becomes favorable, and the corrugating processability tends to be excellent. If it is equal to or less than the upper limit value of the above range, the ash content when fired in air tends to be low.

(Other Components)

The inorganic fiber sheet of the present embodiment may contain, in addition to the glass fiber and the organic fiber which will be the main fibers as described above, one or more inorganic fibers other than the glass fiber and one or more components added when the inorganic fiber sheet is produced by a wet papermaking process, as long as the effects of the present invention are not impaired.

The inorganic fiber other than the glass fiber is not particularly limited, but in consideration of safety to the human body, it is preferably a biosoluble inorganic fiber.

In the present specification, the biosoluble inorganic fiber is a fiber which does not correspond to "WHO definition respirable fiber" as described above, or it is a fiber that satisfies any one of the following four conditions (1) to (4) based on Nota Q "biosoluble fiber criteria" of EU Directive 97/69/EC. Biosoluble inorganic fibers include biosoluble ceramics, biosoluble rock wool and the like.

The above-mentioned four conditions are as follows.

(1) those with a half-life of fibers having a length longer than 20 µm of less than 10 days in an animal experiment of short-term inhalation exposure;

(2) those with a half-life of fibers having a length longer than 20 µm of less than 40 days in an animal experiment of short-term intratracheal instillation;

(3) those with no significant carcinogenicity in an animal experiment of intraperitoneal administration; and (4) those with no pathological findings or tumorigenesis associated with carcinogenicity in an animal experiment of long-term inhalation exposure (provided that they contain in composition more than 18% by mass of alkali and alkaline earth oxides ($Na_2O$, $K_2O$, CaO, MgO, BaO)).

Biosoluble inorganic fibers usually contain "shot" (non-fibrous material) due to their manufacturing process. If a biosoluble inorganic fiber having a high content of shot is used as an inorganic fiber other than the glass fiber, there are cases where perforation, powder falling and the like will be a problem in the obtained inorganic fiber sheet. Therefore, as the biosoluble inorganic fiber, it is preferable to use those having a shot content of 20% by mass or less, and it is more preferable to use those having a shot content of 15% by mass or less. In addition, one type of biosoluble inorganic fiber may be used alone, or two or more types may be used in combination.

It should be noted that the inorganic fiber sheet of the present embodiment preferably does not contain ceramic fibers classified in Category 2 (suspected of being carcinogenic) according to EU Directive 97/69EC from the viewpoint of safety to the human body. Further, the proportion of the inorganic fiber other than the glass fiber in the inorganic fiber sheet is preferably 45% by mass or less, more preferably 40% by mass or less, and still more preferably 30% by mass or less with respect to the total mass of the inorganic fiber sheet.

Components to be added in producing the inorganic fiber sheet by a wet papermaking process are not particularly limited, but examples thereof include an organic binder component, an inorganic binder component, an auxiliary agent, an additive and a filler.

The organic binder component is a component that bonds the fibers with each other. As the organic binder component, a thermoplastic resin or the like in which at least a part thereof is melted by heating at the time of producing the inorganic fiber sheet can be mentioned. The thermoplastic resin used as the organic binder component can be appropriately selected depending on the drying temperature at the time of producing the inorganic fiber sheet and the like. The form of the organic binder component is not limited and may be of any forms such as fibrous, particulate, emulsion, liquid and the like.

As the thermoplastic resin, for example, a polyethylene resin, a vinyl chloride resin, a (meth)acrylate resin, a styrene-acrylate copolymer, a vinyl acetate resin, a vinyl acetate-(meth)acrylate copolymer, an ethylene-vinyl acetate copolymer, a polyester-based resin, a polyvinyl alcohol (PVA), an ethylene-vinyl alcohol copolymer and the like can be mentioned. Further, rubber-based emulsions such as styrene-butadiene rubber (SBR) and nitrile rubber (NBR) may also be used. As the thermoplastic resin, one or more of them can be used.

Further, as the organic binder component, a conjugate fiber in which two or more types of materials having different melting points are conjugated and the part having a lower melting point is melted to act as a binder may be used. As the conjugate fiber, a core-sheath fiber, a side-by-side fiber and the like can be mentioned. As the core-sheath fiber, e.g., fibers in which a sheath portion composed of polyethylene or the like and having a low melting point is formed around a core portion composed of polyethylene terephthalate, polypropylene or the like and having a high melting point can be mentioned.

As the organic binder component, a thermosetting resin which is cured by heating during the process of producing the inorganic fiber sheet to bond the fibers with each other can also be used.

Examples of the thermosetting resin include a phenol resin, an epoxy resin, a melamine resin, a urea resin, an unsaturated polyester resin, a polyurethane resin and a thermosetting polyimide resin. As the thermosetting resin, one or more of these can be used.

Although the organic binder component is not particularly limited, it is preferable to use a polyvinyl alcohol (PVA) from the viewpoint of excellent adhesive force. Further, when it is desired to improve the water resistance, it is preferable to use an acrylic resin as the organic binder component in combination, and it is more preferable to externally apply an acrylic resin emulsion or the like by spray coating or the like.

The content of the organic binder component with respect to the inorganic fiber sheet is preferably from 1 to 25% by mass, more preferably from 3 to 20% by mass, and still more preferably from 5 to 15% by mass. When the content of the organic binder component is equal to or more than the lower limit value of the above range, the fibers can be sufficiently bonded to each other. If it is equal to or less than the upper limit value of the above range, when the inorganic fiber sheet is fired, the amount of the organic binder component to be reduced to ashes is small, and an excellent filter can be produced.

When PVA is used as the organic binder component, the content of PVA with respect to the total amount of the organic binder component is preferably 20% by mass or more, more preferably 40% by mass or more, and may even be 100% by mass. When an acrylic resin emulsion is used as the organic binder component, the content of the acrylic resin (solid content) with respect to the total amount of the organic binder component is preferably from 5 to 70% by mass.

Although the inorganic binder component is not particularly limited, examples thereof include colloidal silica, water glass, calcium silicate, silica sol, alumina sol, sepiolite, alkoxysilane and the like. As the inorganic binder component, one or more of these can be used. However, when an external force such as friction, bending and the like is applied to these inorganic binders, the powder may fall off to deteriorate the handling properties in some cases. For this reason, the content of the inorganic binder component as the content with respect to the inorganic fiber sheet is preferably 40% by mass or less, and more preferably 30% by mass or less.

Examples of the auxiliary agent include a crosslinking agent of an epoxy type, an isocyanate type, a carbodiimide type, an oxazoline type or the like, and a silane coupling agent having a functional group such as an amino group, an epoxy group, a methacryloxy group, an acryloxy group and a mercapto group, and one or more of these can be used. The content of the silane coupling agent is preferably used within a range of 10 parts by mass or less with respect to 100 parts by mass of the organic binder component.

Examples of the additive include an antioxidant, a light stabilizer, an ultraviolet absorber, a thickener, a nucleating agent, a neutralizing agent, a lubricant, an antiblocking agent, a dispersing agent, a fluidity improver, a mold release agent, a flame retardant, a foaming agent, a coloring agent, a wetting agent, a viscosity improver, an yield improver, a paper strength improver, a drainage aid, a pH adjusting agent, a defoaming agent, an antiseptic agent and a pitch controller, and one or more of these can be used. The content of the additive is preferably 5% by mass or less with respect to the inorganic fiber sheet.

Examples of the filler include calcium silicate, calcium carbonate, kaolin, talc, plastic pigments, glass beads, hollow glass beads and Shirasu balloons, and one or more of these can be used.

It should be noted that in the case of containing an organic binder component, an inorganic binder component, a filler and the like, it is preferable to adjust the amounts used so that the contents of each of the inorganic fiber and the organic fiber in the inorganic fiber sheet are within the ranges already described above.

The basis weight of the inorganic fiber sheet of the present embodiment is not particularly limited and may be, for example, from 10 to 100 g/m$^2$, and is preferably from 15 to 60 g/m$^2$. If the basis weight is equal to or more than the lower limit value of the above range, the strength of the inorganic fiber sheet and the honeycomb molded body obtained from the inorganic fiber sheet can be sufficiently obtained, and if it is equal to or less than the upper limit value of the above range, the thickness can be suppressed, and the pressure loss can also be suppressed.

In the inorganic fiber sheet of the present embodiment, the ash content after firing in air at 500° C. for 2 hours is preferably 60% by mass or more, and more preferably 75% by mass or more. When the ash content is equal to or more than the lower limit value of the above range, the amount of the organic component reduced to ashes by firing is not too large, and a honeycomb molded body having excellent strength can be produced. Although the upper limit of the ash content is not particularly limited, for example, it is preferably 95% by mass or less, and more preferably 90% by mass or less. When the ash content is equal to or less than the above upper limit value, the minimum required amount of the organic fiber and the organic binder can be contained, and the mechanical strength necessary for the sheet and processability can be imparted. It should be noted that the ash content is a value measured by the method described in Examples to be described later.

In the inorganic fiber sheet of the present embodiment, the fold number in the papermaking direction at a load of 1.0 kg is preferably 5 times or more, and more preferably 7 times or more. if the fold number is equal to or more than the lower limit value of the above range, no splitting occurs at the corrugation peak portion, the cell fold number is a value measured by the method described in Examples to be described later.

(Production Method of Inorganic Fiber Sheet)

Next, an example of a method for producing the inorganic fiber sheet of the present embodiment will be described. The inorganic fiber sheet of the present embodiment is one for producing an inorganic fiber sheet by subjecting a raw material slurry containing the above-mentioned inorganic fiber and organic fiber to a wet papermaking process.

The raw material slurry used for producing the inorganic fiber sheet contains an inorganic fiber (mainly a glass fiber)

and an organic fiber as the main fibers, and includes an organic binder component, an inorganic binder component, a filler, and the like as optional components. In addition, as a medium, it usually contains water.

The wet papermaking process can be carried out by a method of preparing a raw material slurry containing each of the above-mentioned components and water (medium) and then subjecting the raw material slurry to a papermaking process with a known papermaking machine. Examples of the paper machine include a cylinder papermaking machine, an inclined-type papermaking machine, a Fourdrinier papermaking machine, and a short net papermaking machine. A multilayer papermaking process may be carried out by combining the same or different papermaking machines among these papermaking machines.

There are no particular limitations on the dehydration and drying methods after the papermaking process, and, for example, a known dryer such as a Yankee dryer, a cylinder dryer, an air dryer and an infrared dryer can be used. The drying temperature is not particularly limited, but is usually about 100° C. to 200° C.

It should be noted that in the case of using an organic binder component or an inorganic binder component, in addition to adding to the raw material slurry for producing the inorganic fiber sheet, a liquid containing an organic binder component or an inorganic binder component may be deposited (externally applied) with respect to the obtained inorganic fiber sheet by a method such as spray coating, curtain coating, impregnation coating, bar coating, roll coating and blade coating. The nonwoven fabric as an object of the external application may be a dry nonwoven fabric after drying or a wet web before drying.

<Honeycomb Molded Body>

Next, an example of a configuration of a honeycomb molded body which is one embodiment employing the present invention will be described.

The honeycomb molded body of the present embodiment is a structure processed into a honeycomb shape by subjecting the above-mentioned inorganic fiber sheet to a corrugating process.

First, in the honeycomb molded body, the above-mentioned inorganic fiber sheet is subjected to a corrugating process, thereby imparting a corrugated shape (convexoconcaves). Next, the corrugated inorganic fiber sheet (corrugating medium) and an inorganic fiber sheet (liner) which is not subjected to a corrugating process are adhered to produce a single-face corrugated, molded body. Then, a plurality of single-face corrugated, molded bodies are laminated or formed into a cylindrical shape, whereby a honeycomb molded body is obtained.

As the adhesive to be used at that time, an inorganic paste such as colloidal silica, water glass, sepiolite and alumina sol can be mentioned, and one or more of these can be used. Further, as the adhesive, an organic paste such as ethylene-vinyl alcohol may be used in combination.

The honeycomb molded body of the present embodiment may be used as it is, or may be used after being fired.

<Honeycomb Filter>

Next, an example of a configuration of a honeycomb filter which is one embodiment employing the present invention will be described.

The honeycomb filter of the present embodiment is obtained by supporting at least one functional material on the honeycomb molded body described above.

Examples of the functional material include an adsorbent and a dehumidifying agent.

As the adsorbent, one or more types selected from the group consisting of silica gel, zeolite, sepiolite, activated carbon and ion exchange resins are preferable from the viewpoint of adsorptivity and the like. In addition, various adsorbents can be used as functional materials.

Examples of the adsorbent used as a dehumidifying agent include silica, zeolite, hydrophobic synthetic zeolite, natural zeolite, sepiolite, hydrotalcite, alumina, lime, gypsum, magnesia lime, magnesium hydroxide, pearlite, diatomaceous earth, lithium chloride, calcium chloride, Portland cement, alumina cement, palygorskite, aluminum silicate, activated clay, activated alumina, bentonite, talc, kaolin, mica, activated carbon and water absorbing polymers.

Examples of other functional materials include solid adsorbents in which alkaline compounds (potassium carbonate, sodium carbonate, sodium hydrogen carbonate, calcium hydroxide, calcium carbonate and the like) are supported by carriers having adsorption capacity, or by, for example, activated carbon, silica, alumina, allophane, sepiolite, cordierite, other clay minerals and the like; sodium hydroxide, potassium hydroxide, potassium carbonate, calcium hydroxide, ion exchange resins and deodorants. In addition, a porous adsorbent in which a catalyst such as titanium is supported in pores can also be used as a functional material.

Examples of a method of loading the functional material include a known method of impregnating the inorganic fiber sheet or the honeycomb molded body described above with a slurry containing the functional material, followed by drying.

The above slurry may contain one or more inorganic adhesives such as colloidal silica, water glass, sepiolite and alumina sol for the purpose of improving the supporting properties of the functional material and the strength of the honeycomb molded body.

As described above, since the inorganic fiber sheet of the present embodiment has a configuration including a glass fiber as a main component and containing 3 to 20% by mass of an organic fiber having an aspect ratio of 300 to 2000, flexibility is imparted while maintaining the strength of the sheet. Therefore, according to the inorganic fiber sheet of the present embodiment, it is possible to produce a filter substrate excellent in corrugating processability and having sufficient strength and capability of loading sufficient amount of a functional material.

The inorganic fiber sheet of the present embodiment provides safety to the human body when the weighted average fiber diameter of the glass fiber is 3 μm or more.

Since the honeycomb molded body of the present embodiment is obtained by subjecting the above-mentioned inorganic fiber sheet to a corrugating process, it has sufficient strength and capability of loading sufficient amount of an adsorbent.

The honeycomb filter of the present embodiment is a high-performance filter.

EXAMPLES

Hereinafter, the present invention will be described more specifically with reference to Examples and Comparative Examples, but the present invention is not limited by the following Examples.

<Measurement Method and Evaluation Method>

(Basis Weight)

With respect to the obtained inorganic fiber sheet, measurement was carried out in accordance with JIS P 8124.

(Thickness)

With respect to the obtained inorganic fiber sheet, measurement was carried out in accordance with JIS P 8118.

(Tensile Strength)

With respect to the obtained inorganic fiber sheet, measurement was carried out by a Tensilon type tensile tester (manufactured by Orientec Corporation) through a method in accordance with JIS P 8113.

(Bending Resistance)

With respect to the obtained inorganic fiber sheet, measurement was carried out by the BENDING RESISTANCE TESTER (manufactured by Lorentzen & Wettre) through a method in accordance with ISO 2493.

(Fold Number)

With respect to the obtained inorganic fiber sheet, the average number was calculated for 10 test pieces measured at a load of 1.0 kg using the MIT tester in accordance with JIS P 8115 folding endurance test method.

(Ash Content)

With respect to the obtained inorganic fiber sheet, measurement was carried out in accordance with JIS P 8251 except that it was burned for 2 hours at 500° C. instead of 525° C.

(Liquid Retention Amount)

With respect to the obtained inorganic fiber sheet, the dry mass A (g/m$^2$) of the inorganic fiber sheet (100 mm×100 mm) was measured in accordance with the measurement of water retention rate specified in JIS L 1913. Thereafter, the inorganic fiber sheet was immersed in pure water for 15 minutes, then taken out, and was suspended until the dropping of water droplets due to its own weight stopped, and then the mass B (g/m$^2$) was measured. The value obtained by subtracting the mass A from the mass B was taken as the liquid retention amount. It should be noted that the liquid retention amount was converted to a value per 1 m$^2$ and listed in the table.

(Corrugating Processability)

The obtained inorganic fiber sheet was subjected to a corrugating process, and the corrugating processability was evaluated based on the following indicators.

S: The undulating pattern is very favorable, and the wave shape is very excellent.

A: The undulating pattern is favorable, and the wave shape is favorable.

B: The undulating pattern is slightly poor, and the wave shape is slightly crushed. The cell shape is somewhat uneven.

C: The undulating pattern is poor, and there is a crack or split at the peak of the wave. The cell shape is uneven.

(Powder Falling)

The obtained inorganic fiber sheet was subjected to a corrugating process, and the state of the paper dust on the floor surface of the take-up and feeding portion and between the corrugated gears was visually observed, and the powder falling was evaluated based on the following indicators.

A: Paper dust is hardly generated both on the floor surface and between the gears.

B: Paper dust is somewhat seen on the floor surface or between the gears, but it is within the allowable range.

C: Much paper dust is seen on the floor surface, or paper dust clearly accumulates between the gears.

Example 1

84% by mass of a glass fiber (diameter: 6 μm, length: 6 mm), 8% by mass of a polyethylene terephthalate fiber (diameter: 3.5 μm, length: 5 mm, aspect ratio: 1429) as an organic fiber and 8% by mass of a polyvinyl alcohol (POVAL K-17U6, manufactured by KURARAY Co., Ltd.) as a binder were mixed to prepare a raw material slurry, and the resultant was dispersed in water at a concentration of 0.2%. A web having a random arrangement was formed by a wet papermaking method, and an acrylic emulsion was spray coated and dried so as to be 0.3 g/m$^2$. The weighing, thickness, tensile strength, bending resistance, fold number, and liquid retention amount of the obtained inorganic fiber sheet were measured. The results are shown in Table 1.

The obtained inorganic fiber sheet was fired in air at 500° C. for 2 hours, and then the ash content of the resulting sheet was measured. The results are shown in Table 1.

Subsequently, the obtained inorganic fiber sheet was subjected to a corrugating process by being processed into an undulating shape having a height of 1.4 mm and a pitch of 2.6 mm to form a corrugating medium and adhered onto a flat sheet liner composed of the obtained inorganic fiber sheet with an inorganic adhesive containing silica sol as a main component, and the resultant was wound up to produce a honeycomb molded body having a cylindrical shape.

With respect to the obtained honeycomb molded body, the corrugating processability and powder falling were evaluated. The results are shown in Table 1.

Example 2

An inorganic fiber sheet having the basis weight and thickness shown in Table 1 was obtained in the same manner as in Example 1 except that the organic fiber was changed to a polyethylene terephthalate fiber (diameter: 5 μm, length: 5 mm, aspect ratio: 1000).

Thereafter, the measurement and evaluation were carried out in the same manner as in Example 1. The results are shown in Table 1.

Example 3

An inorganic fiber sheet having the basis weight and thickness shown in Table 1 was obtained in the same manner as in Example 1 except that the organic fiber was changed to a polyethylene terephthalate fiber (diameter: 8 μm, length: 5 mm, aspect ratio: 625).

Thereafter, the measurement and evaluation were carried out in the same manner as in Example 1. The results are shown in Table 1.

Example 4

An inorganic fiber sheet having the basis weight and thickness shown in Table 1 was obtained in the same manner as in Example 1 except that the organic fiber was changed to a polyethylene terephthalate fiber (diameter: 12 μm, length: 5 mm, aspect ratio: 417).

Thereafter, the measurement and evaluation were carried out in the same manner as in Example 1. The results are shown in Table 1.

Example 5

An inorganic fiber sheet having the basis weight and thickness shown in Table 1 was obtained in the same manner as in Example 1 except that the organic fiber was changed to a flat polyethylene terephthalate fiber (short diameter: 8 μm, long diameter: 32 μm (equivalent to a circle having a diameter of 16 μm), length: 5 mm, aspect ratio: 313).

Thereafter, the measurement and evaluation were carried out in the same manner as in Example 1. The results are shown in Table 1.

Example 6

An inorganic fiber sheet having the basis weight and thickness shown in Table 1 was obtained in the same manner as in Example 1 except that the organic fiber was changed to a polyethylene terephthalate fiber (diameter: 17 μm, length: 10 mm, aspect ratio: 588).

Thereafter, the measurement and evaluation were carried out in the same manner as in Example 1. The results are shown in Table 1.

Comparative Example 1

An inorganic fiber sheet having the basis weight and thickness shown in Table 1 was obtained in the same manner as in Example 1 except that the organic fiber was changed to a polyethylene terephthalate fiber (diameter: 17 μm, length: 5 mm, aspect ratio: 294).

Thereafter, the measurement and evaluation were carried out in the same manner as in Example 1. The results are shown in Table 1.

Comparative Example 2

An inorganic fiber sheet having the basis weight and thickness shown in Table 1 was obtained in the same manner as in Example 1 except that the organic fiber was changed to a polyethylene terephthalate fiber (diameter: 24 μm length: 5 mm, aspect ratio: 208).

Thereafter, the measurement and evaluation were carried out in the same manner as in Example 1. The results are shown in Table 1.

Comparative Example 3

An inorganic fiber sheet having the basis weight and thickness shown in Table 1 was obtained in the same manner as in Example 1 except that the organic fiber was changed to N pulp (diameter: 23 μm, length: 0.7 mm, aspect ratio: 30).

Thereafter, the measurement and evaluation were carried out in the same manner as in Example 1. The results are shown in Table 1.

Comparative Example 4

An inorganic fiber sheet having the basis weight and thickness shown in Table 1 was obtained in the same manner as in Example 3 except that the organic fiber was changed to 2% by mass of the polyethylene terephthalate fiber.

Thereafter, the measurement and evaluation were carried out in the same manner as in Example 1. The results are shown in Table 1.

Comparative Examples 5 and 6

An inorganic fiber sheet having the basis weight and thickness shown in Table 1 was obtained in the same manner as in Example 3 except that the glass fiber was changed to 84% by mass of a ceramic fiber (diameter: 2.2 μm, length: 6 mm).

Thereafter, the measurement and evaluation were carried out in the same manner as in Example 1. The results are shown in Table 1.

TABLE 1

| | | | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|---|---|
| Glass fiber (6μ × 6 mm) | 6μ × 6 mm | % by mass | 84 | 84 | 84 | 84 | 84 | 84 | 84 | 84 | 84 | 90 | | |
| Ceramic fiber | 2.2μ × 6 mm | % by mass | | | | | | | | | | | 84 | 84 |
| PET fiber | 3.5μ × 5 mm | % by mass | 8 | | | | | | | | | | | |
| PET fiber | 5μ × 5 mm | % by mass | | 8 | | | | | | | | | | |
| PET fiber | 8μ × 5 mm | % by mass | | | 8 | | | | | | | 2 | | |
| PET fiber | 12μ × 5 mm | % by mass | | | | 8 | | | | | | | 8 | 8 |
| Flat PET (equivalent to φ16μ) | 8μ × 32μ × 5 mm | % by mass | | | | | 8 | | | | | | | |
| PET fiber | 17μ × 10 mm | % by mass | | | | | | 8 | | | | | | |
| PET fiber | 17μ × 5 mm | % by mass | | | | | | | 8 | | | | | |
| PET fiber | 24μ × 5 mm | % by mass | | | | | | | | 8 | | | | |
| N pulp | 23μ × 0.7 mm | % by mass | | | | | | | | | 8 | | | |
| Polyvinyl alcohol | | % by mass | 8 | 8 | 8 | 8 | 8 | 8 | 8 | 8 | 8 | 8 | 8 | 8 |
| Acrylic emulsion | | g/m² | 0.3 | 0.3 | 0.3 | 0.3 | 0.3 | 0.3 | 0.3 | 0.3 | 0.3 | 0.3 | 0.3 | 0.3 |
| Organic fiber in sheet | | % by mass | 7.9 | 7.9 | 7.9 | 7.9 | 7.9 | 7.9 | 7.9 | 7.9 | 7.9 | 2.0 | 7.9 | 8.0 |
| Organic fiber aspect ratio | | — | 1,429 | 1,000 | 625 | 417 | 313 | 588 | 294 | 208 | 30 | 625 | 417 | 417 |
| Organic glass fiber diameter | | — | 0.6 | 0.8 | 1.3 | 2.0 | 2.7 | 2.8 | 2.8 | 4.0 | 3.8 | 1.3 | — | — |
| Basis weight | | g/m² | 32 | 32 | 32 | 32 | 32 | 32 | 32 | 32 | 32 | 42 | 32 | 52 |
| Thickness | | μm | 184 | 185 | 191 | 199 | 184 | 199 | 198 | 197 | 174 | 249 | 153 | 250 |
| Ash content | | % | 83.2 | 83.2 | 83.2 | 83.2 | 83.2 | 83.2 | 83.2 | 83.2 | 83.2 | 89.4 | 83.2 | 83.5 |
| Liquid retention amount | | g/m² | 255 | 231 | 276 | 290 | 247 | 285 | 279 | 290 | 213 | 314 | 129 | 208 |
| Tensile strength | | N/15 mm | 23.5 | 17.5 | 18.8 | 18.7 | 19.1 | 20.4 | 18.6 | 16.2 | 17.6 | 24.0 | 9.1 | 10.7 |
| Bending resistance | | mN | 44 | 48 | 52 | 55 | 53 | 53 | 56 | 47 | 55 | 76 | 21 | 43 |
| Fold number | | Times | 14 | 12 | 7 | 7 | 7 | 9 | 4 | 2 | 4 | 7 | 0 | 0 |
| Corrugating processibility | | — | S | S | S | A | A | A | B | C | B | C | A | A |
| Power falling | | — | A | A | A | A | A | A | B | C | A | A | B | B |

As shown in Table 1, in Comparative Example 1, the shape of the cell was uneven, and the paper dust was also generated.

In Comparative Example 2, cracks occurred at the cell peak and the paper dust was also generated.

In Comparative Example 3, the shape of the cell was uneven.

In Comparative Example 4, it was difficult to form an undulating pattern, and a portion that did not have a wave-like shape occurred.

In Comparative Examples 5 and 6, there was no problem in the processability, although the paper dust was generated. However, compared to Examples 1 to 6, the amount of liquid retained was smaller in Comparative Example 5, and the thickness was larger in Comparative Example 6.

In Examples 1 to 6, the corrugating processability was excellent. In addition, the strength was sufficient, there was no powder falling, and the amount of liquid retained was also sufficient.

INDUSTRIAL APPLICABILITY

Since the inorganic fiber sheet of the present invention is excellent in corrugating processability and has sufficient strength, it can be used industrially in the field of heat insulating materials, heat resistant cushioning materials, heat resistant shielding materials, separators and carriers of functional materials such as catalysts, and the like. Further, the honeycomb molded body of the present invention can be used industrially in the field of honeycomb filters for heat exchange which carries a functional material such as an adsorbent and honeycomb filters for gas adsorption.

The invention claimed is:

1. An inorganic fiber sheet comprising a glass fiber for forming a honeycomb molded body,
   wherein the amount of the glass fiber in the inorganic fiber sheet is more than 50% by mass with respect to the total mass of the inorganic fiber sheet,
   wherein the inorganic fiber sheet comprises 3 to 20% by mass of an organic fiber having an aspect ratio of 300 to 2000 with respect to a total amount of the inorganic fiber sheet, and
   wherein an ash content after firing in air at 500° C. for 2 hours is 60% by mass or more.

2. The inorganic fiber sheet according to claim 1,
   wherein a weighted average fiber diameter of the organic fiber is equal to or less than 3 times a weighted average fiber diameter of the glass fiber.

3. The inorganic fiber sheet according to claim 1, wherein a fold number in a papermaking direction at a load of 1.0 kg is 5 times or more.

4. The inorganic fiber sheet according to claim 2, wherein a fold number in a papermaking direction at a load of 1.0 kg is 5 times or more.

5. The inorganic fiber sheet according to claim 1, wherein the ash content after firing in air at 500° C. for 2 hours is 95% by mass or less.

* * * * *